INVENTOR.
Hiram E. Temple
BY
Otto Maeller
Attorney

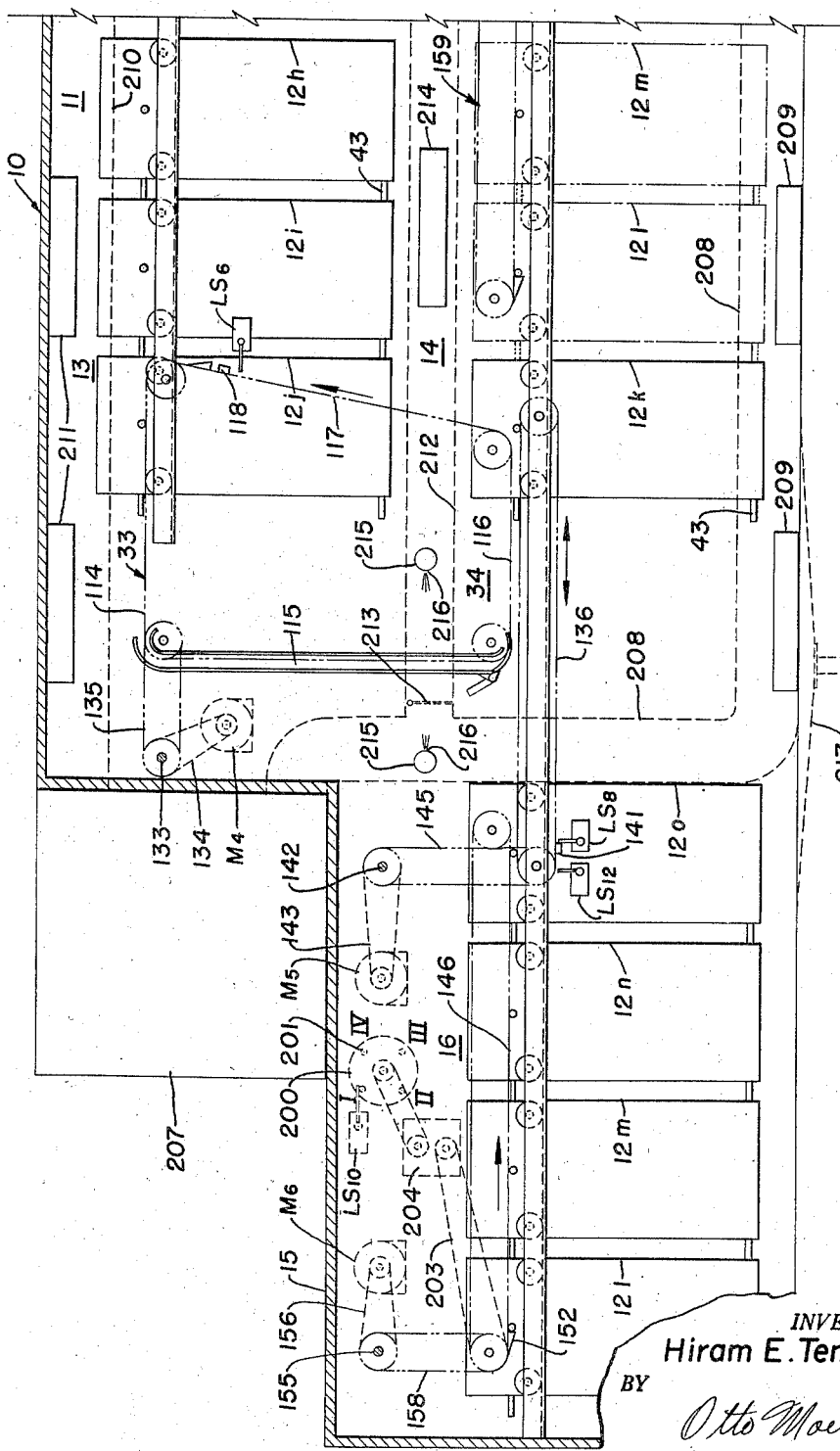

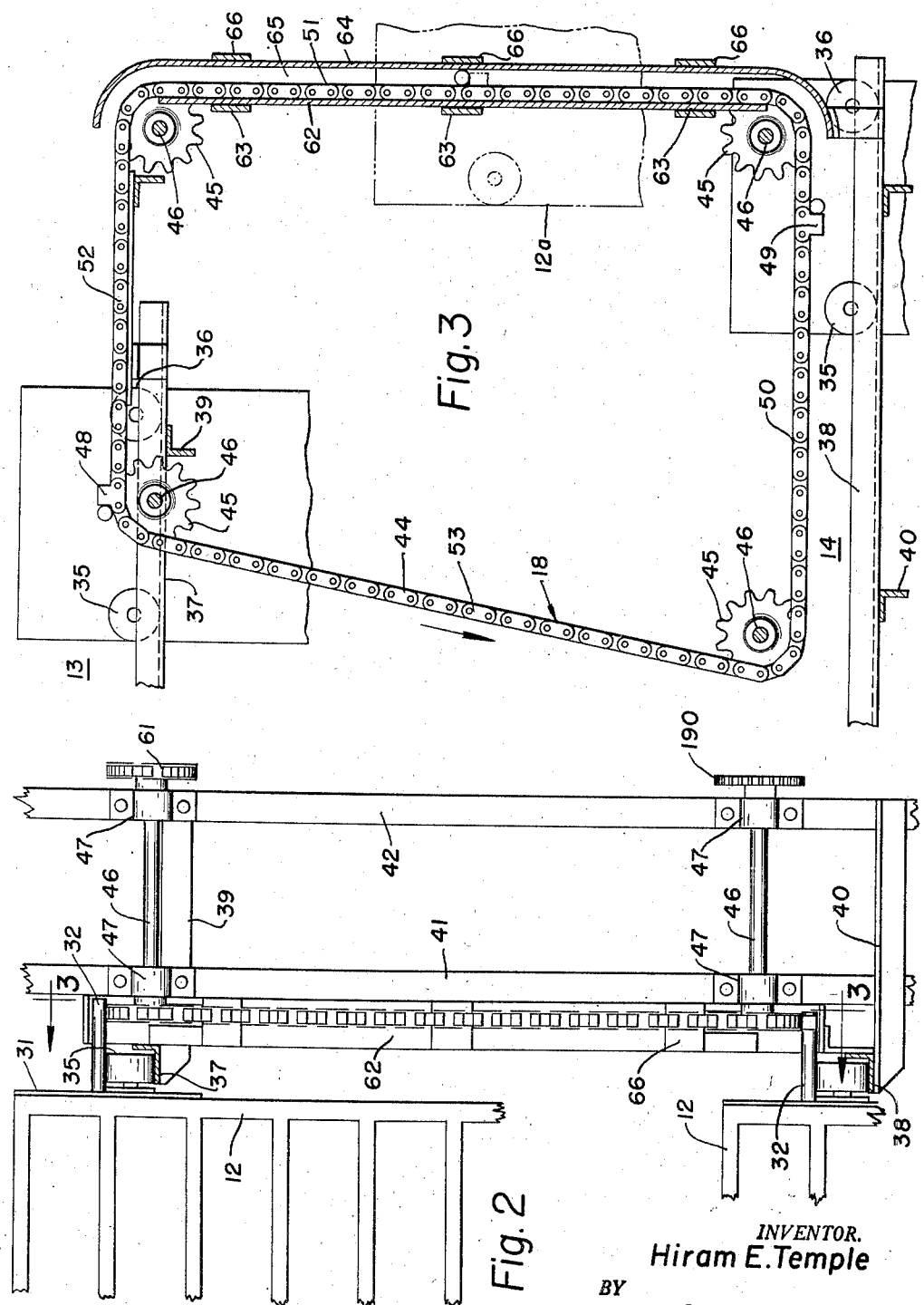

Feb. 18, 1958     H. E. TEMPLE     2,823,811
PROOFER
Filed June 29, 1955     10 Sheets-Sheet 4
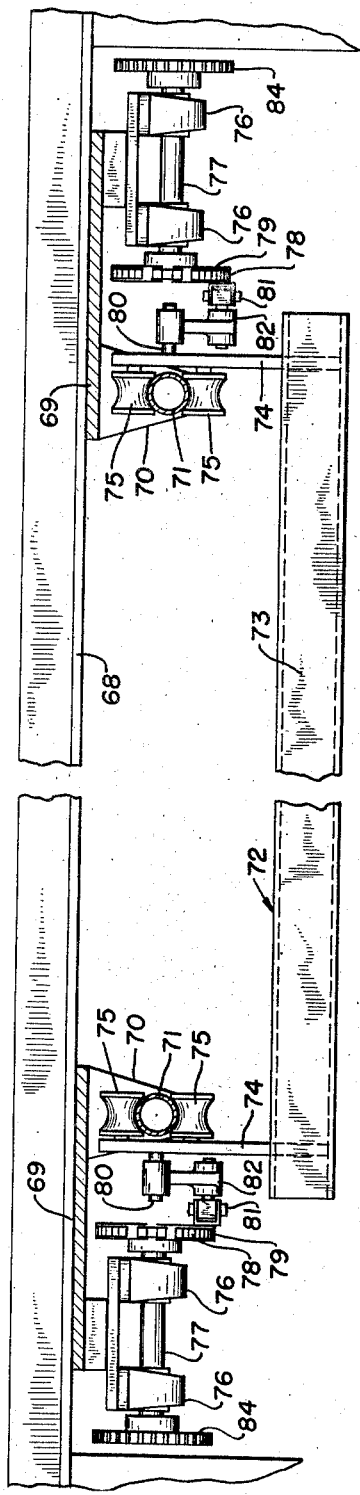
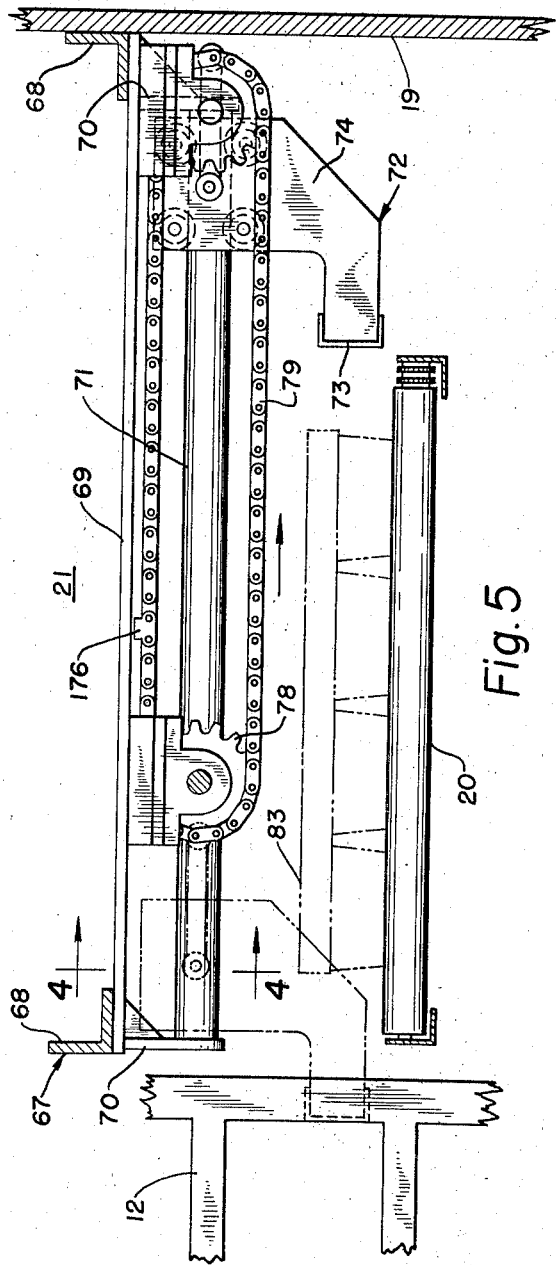
INVENTOR.
Hiram E. Temple
BY
Otto Moeller
Attorney Feb. 18, 1958     H. E. TEMPLE     2,823,811
PROOFER
Filed June 29, 1955     10 Sheets-Sheet 5
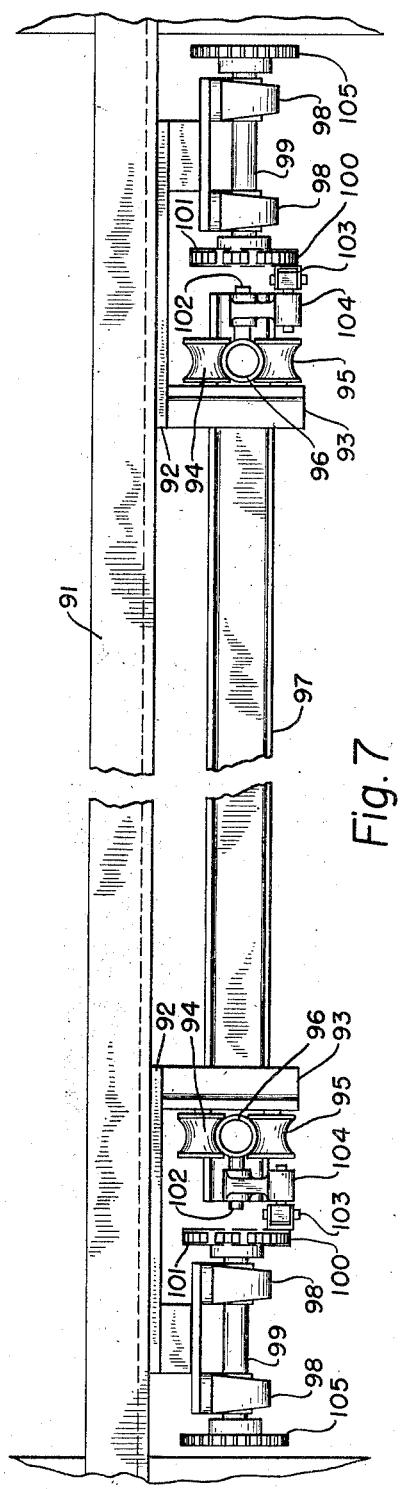
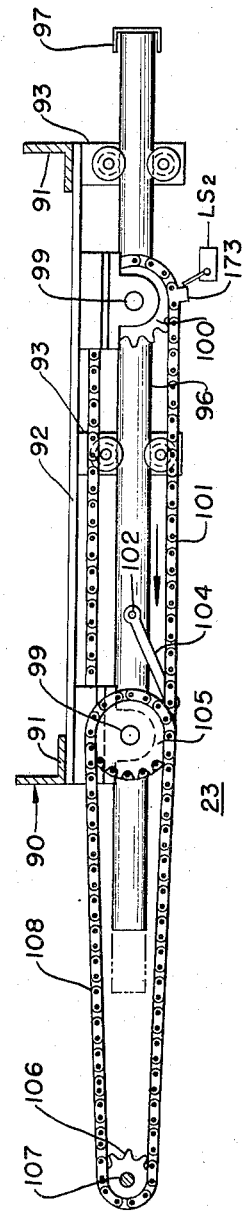
INVENTOR.
Hiram E. Temple
BY
Otto Moeller
Attorney

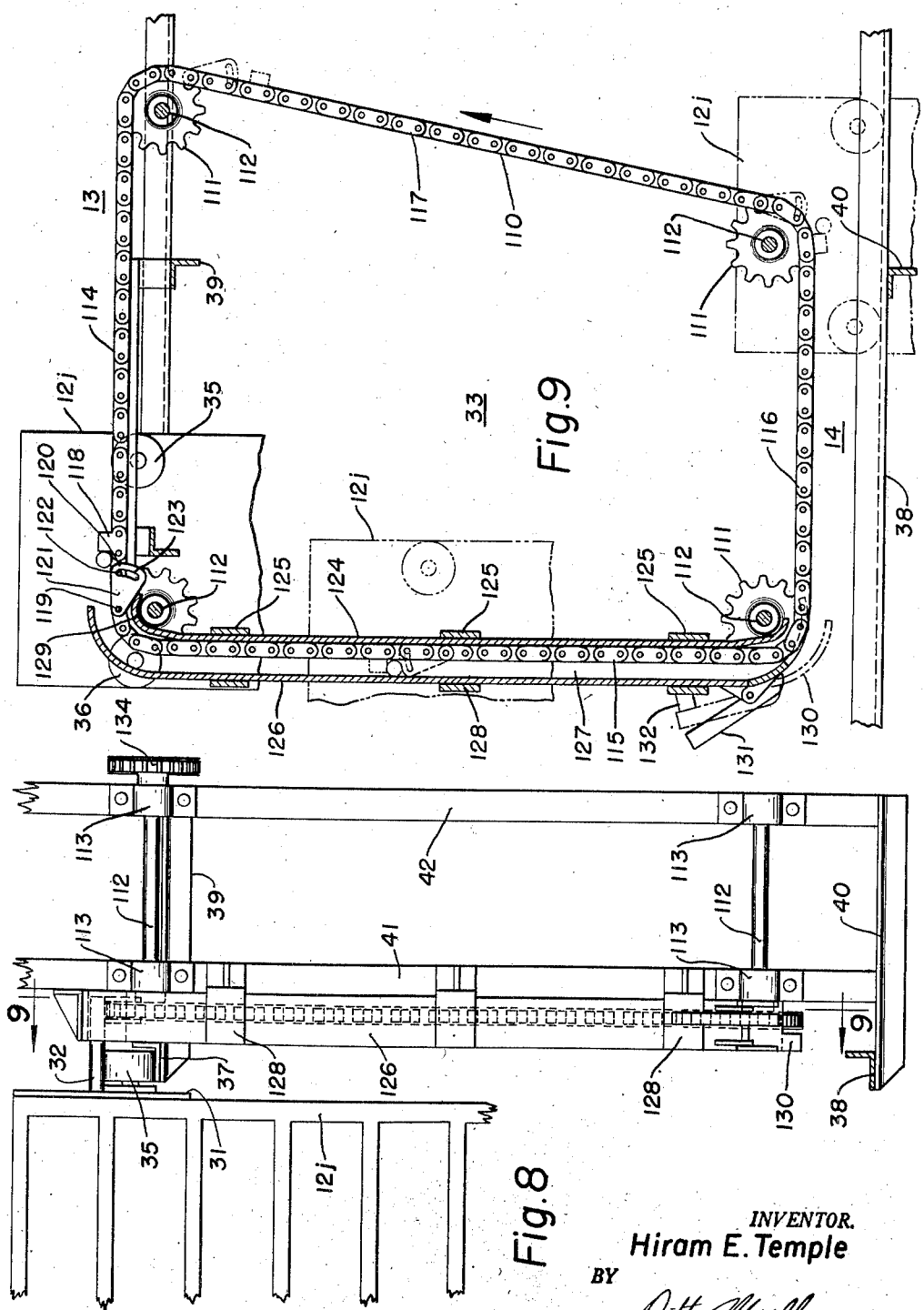

Feb. 18, 1958

H. E. TEMPLE 2,823,811

PROOFER

Filed June 29, 1955

INVENTOR.
Hiram E. Temple
BY
Otto Moeller
Attorney

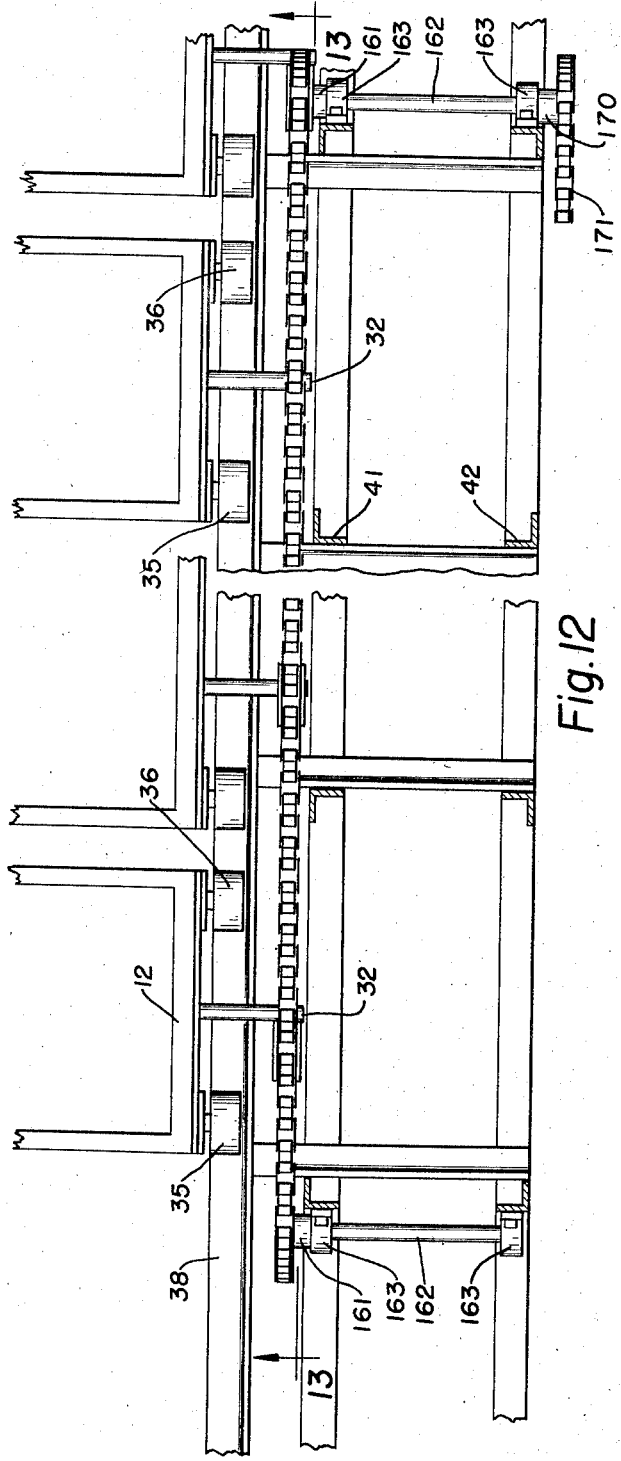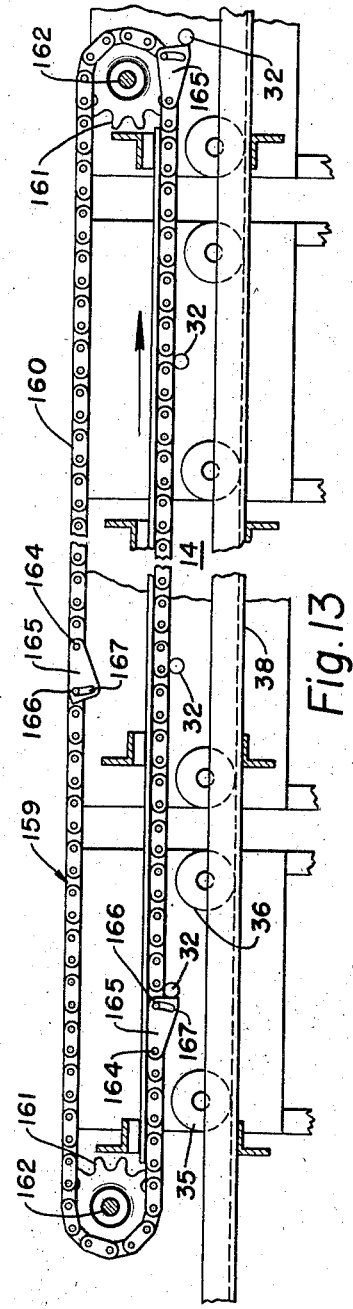

Feb. 18, 1958  H. E. TEMPLE  2,823,811
PROOFER

Filed June 29, 1955  10 Sheets-Sheet 10

INVENTOR.
Hiram E. Temple
BY
Otto Moeller
Attorney

United States Patent Office 2,823,811
Patented Feb. 18, 1958

2,823,811

PROOFER

Hiram E. Temple, York, Pa., assignor, by mesne assignments, to Capitol Products Corporation, a corporation of Pennsylvania Application June 29, 1955, Serial No. 518,770

17 Claims. (Cl. 214—16.4)

This invention relates to a continuous dough proofer and more particularly to a proofer in which pans of dough to be proofed are disposed on racks which consist of mobile carriers having a plurality of shelves and which racks are movable in a closed loop through the proofing chamber.

The pans of dough in traveling through the proofing chamber are subjected to such temperature and relative humidity as to cause further fermentation of yeast normally present in the dough, the fermented yeast causing the dough to rise to full or desired size or volume in relation to weight. For different doughs in the production of different kinds of bread the proof time will vary and it is important to maintain close control of the proofing time, so that the dough is not under or over proofed and uniformity of product is insured.

An important feature of my novel proofer is that it may be charged with a run of dough requiring a different proof time than a preceding run of dough while dough of the preceding run is still in the proofing chamber, and whereby each run of dough will receive its required proof time. For example, assuming the closed rack transporting loop of the proofer chamber is provided with its full complement of racks and the proofer has been charged with a run of slow proof time dough. It is now desired to transport a run of fast proof time dough through the proofer while racks of slow proof time dough are still in the proofer. This may be done by permitting one or more empty racks to pass by the loading station before loading the fast proof time dough and then at a station remote from the loading station, withdrawing one or more of the empty racks from the closed rack transporting loop, means being provided along the path of the racks back to the loading and unloading station for accelerating the racks of the fast proof time dough through the vacancy formed by the withdrawal of the said one or more empty racks. Thus the racks of fast proof time dough complete the circuit through the proofer in a shorter period of time resulting in a shorter proof time. This shortened proof time may be varied depending on the number of racks withdrawn and this is an important feature of my invention.

Conversely, a proofing operation conducted with less than a full complement of racks in the transporting loop, in other words, with one or more of the racks withdrawn from the transporting loop, may be followed by a proofing operation requiring a greater proofing time by inserting one or more of the withdrawn racks into the closed rack transporting loop between the last rack of lesser proof time dough and the first rack of greater proof time dough. This constitutes another important feature of the invention.

It will be apparent from the above that successive batches of dough requiring different proof times may be transported through the proofer with a minimum of interruption between successive batches. In other words, the operator does not have to wait until the proofer has been cleared of dough requiring one certain proof time before introducing pans of dough requiring a different proof time, whereby considerable saving in time is effected and a practically uninterrupted operation is made possible. With this arrangement, bakery goods requiring a proofing time differing from that of bakery goods previously introduced into the proofing chamber, may be made to follow closely behind the previously introduced goods without it being necessary to empty the proofer, which is an important feature.

Another important feature of the invention is the provision of selective means controlled by the operator for automatically withdrawing one or more pre-selected racks from the closed loop when such rack or racks reach the withdrawing conveyor. More specifically and with reference to the above example, assume the operator has permitted four empty racks to pass the loading and unloading station, the invention provides selective means controlled by the operator whereby a conveyor at the rack withdrawal station is automatically operated to remove the four empty racks upon their arrival at the withdrawal station.

A further feature of the invention resides in the provision of selective means controlled by the operator for automatically re-introducing withdrawn racks into the closed loop to follow any desired rack and for automatically re-introducing a predetermined number of such withdrawn racks.

The closed rack conducting loop includes upper and lower tracks along which contiguous racks are adapted to be pushed, and the invention contemplates novel elevating means for engaging a rack on the lower tracks, raising it through the pan loading and unloading station and releasing it on the upper tracks, and novel means for engaging a rack on the upper tracks, lowering it through the rack withdrawing station and releasing it on the lower tracks.

The novel proofer is provided at the loading and unloading station with a number of elements including, a loading conveyor for introducing pans of dough to be proofed, an unloading conveyor for carrying away pans of proofed dough, a loader pusher for transferring pans of dough to be proofed from the loader conveyor onto successive shelves of a rack, an unloader pusher for transferring pans of proofed dough from successive shelves of a rack onto the unloading conveyor, and elevating means for moving a rack step by step to align the individual shelves thereof successively with the unloading and loading conveyors, and an important feature of the invention resides in the arrangement of these elements and the control means for their sequential operation in timed relation.

The rack proofer is furthermore so constructed and arranged to accommodate simple and convenient means for washing the racks.

The invention also provides means whereby any rack or racks may be removed from the proofer for purposes of repair or replacement.

Other objects and advantages reside in certain novel features of the construction, arrangement and combination of parts which will be hereinafter more fully described, reference being had to the accompanying drawings forming a part of this specification, and in which drawings:

Figures 1 and 1A are longitudinal vertical sections through contiguous portions of a proof box with the various elements contained therein shown more or less diagrammatically;

Figure 2 is a view in elevation of the rack elevating means adjacent one side of the proof box;

Figure 3 is a sectional view taken on the line 3—3 of Figure 2;

Figure 4 is a sectional end view of the pusher for loading the pans on the racks of the proofer, taken on the line 4—4 of Figure 5;

Figure 5 is a fragmentary sectional view through the proof box showing the loading pusher of Figure 4 in side elevation;

Figure 6 is a side elevational view of the pusher for unloading the pans from the racks of the proofer;

Figure 7 is a view in end elevation of the unloading pusher of Figure 6;

Figure 8 is a view in elevation of the rack lowering means adjacent one side of the proof box;

Figure 9 is a sectional view taken on the line 9—9 of Figure 8;

Figure 12 is a fragmentary view of the proof box showing in plan the conveying means at one side thereof for moving racks along the lower run of the path of the racks from the rack lowering means to the rack elevating means;

Figure 13 is a sectional view taken on the line 13—13 of Figure 12;

Figure 1:
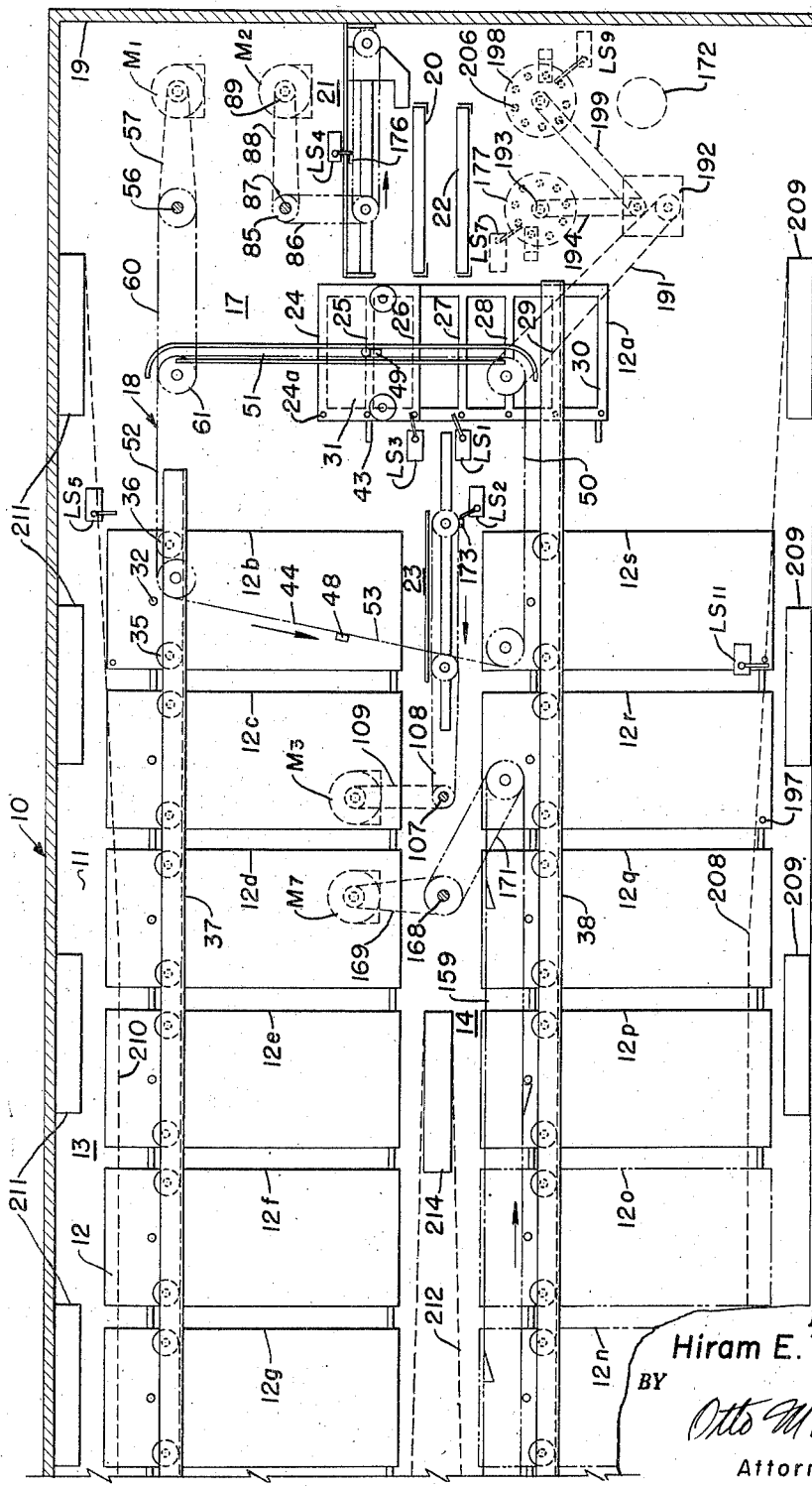

Referring particularly to Figures 1 and 1A, my novel proofer comprises a generally rectangular elongated housing 10 defining a proofing chamber 11 through which racks 12, carrying pans of dough to be proofed, travel in an elongated closed loop having an upper horizontal run 13 and a lower horizontal run 14, and a smaller generally rectangular housing 15 at one end of the housing 10, which end will be referred to as the rearward end of the proofer. The housing 15 defines a rack accommodating chamber 16, which chamber 16 communicates with proofing chamber 11 and is adapted to receive a number of racks 12 withdrawn from the lower run 14 of the closed loop, as and for the reasons hereinafter explained in detail.

The housings 10 and 15 are preferably formed of sheet metal panels supported by suitable skeleton framework, and may be provided with access doors and observation windows, all of which is conventional and therefore has not been particularly illustrated in the drawings. The racks 12 are of generally conventional design, being in the nature of an open rectangular framework having a plurality of vertically spaced horizontal shelves, all made up of metal bars, tubing or the like, the shelves each being adapted to support a plurality of pan sets. Some modifications of a minor nature have been made in the conventional bakers racks to adapt them for conveyance in my novel proofer, and such alterations as have been made will become apparent as the description of my invention proceeds.

The forward end of the proofing chamber 11 is arranged to provide a loading and unloading station 17, at which station pan sets of dough to be proofed are loaded onto the shelves of the racks 12 and pan sets of dough that have been proofed are unloaded from the shelves of the racks 12. Elevating means, indicated generally by reference numeral 18, raises successive racks 12 through the loading and unloading station 17 from the lower horizontal run 14 to the upper horizontal run 13. A pair of horizontal vertically spaced conveyors extend transversely of the proofer housing through a suitable opening, not shown, in a side wall thereof into the loading and unloading station 17 between the rack elevating means 18 and the front wall 19 of the proofer housing 10 so that the shelves of the racks 12 can be successively brought into register with the conveyors as the racks 12 are elevated through the loading and unloading station.

These conveyors may be of any suitable type for conveyance of pan straps as, for example, powered roll conveyors. The upper conveyor 20, hereinafter referred to as the loading conveyor, conveys the pan sets of dough into the proofer to a position in front of the rack being elevated by the elevating means 18, where pusher means, hereinafter referred to as the loading pusher 21, pushes successive groups of pan sets from the loading conveyor 20 onto successive shelves of a rack 12 as it is intermittently elevated through the loading and unloading station 17. The lower conveyor 22, hereinafter referred to as the unloading conveyor, is adapted to convey pan sets of proofed dough from the proofer, successive groups of pan sets being pushed from successive shelves of a rack 12 in the loading and unloading station 17 by pusher means, hereinafter referred to as the unloading pusher 23.

*Racks*

The racks 12 are all identical in construction, so that in describing any one particular rack it will be understood that the other racks are similarly constructed. Referring particularly to Figure 1, rack 12a is shown as having seven shelves, the shelves being designated by the reference numerals 24 to 30. While for purpose of illustration the racks 12 are shown with seven shelves and the operation of the apparatus is described hereinafter in respect of racks with seven shelves, it will become apparent that the apparatus is readily adaptable to handle racks with a lesser or greater number of shelves.

Each of the racks 12 has a plate 31 welded or otherwise rigidly secured across the upper portion of its opposite ends. In Figure 1, a plate 31 is shown on one end of the rack 12a, it being understood that a similar plate is provided on the opposite end thereof, and that all the racks 12 are similarly provided with plates 31. Extending from the face of each of the plates 31, laterally outward of the racks 12 is a pin 32. The pins 32 are disposed above the center of gravity of the racks 12 and located centrally between the sides of the racks. These pins 32 are engaged by the elevating means 18 in transporting successive racks from lower run 14 through the loading and unloading station 17 to upper run 13; and are also engaged by the lowering means, designated generally by the reference numeral 33, in transporting successive racks from upper run 13 through the rack abstracting station 34 to lower run 14, as will be hereinafter described in detail.

Each of the plates 31 of the racks 12 also supports a pair of outboard rollers 35 and 36 located respectively at opposite sides of the pin 32 and disposed in a plane below the level of the pin 32. As best shown in Figures 2 and 8, the rollers 35 and 36 do not project outwardly as far as do the pins 32, and the reason for this will become apparent as the description proceeds. The rollers 35 and 36 engage longitudinally extending tracks disposed along the upper and lower runs 13 and 14. Referring particularly to Figs. 1, 1A, and 2, there is shown an upper track 37 and a lower track 38 of angle iron construction supported respectively on a series of upper and lower brackets 39 and 40 secured to and extending inwardly from inner and outer upright frame members 41 and 42, respectively, at one side of the proofer structure. It is understood that a similar upper and lower track and supporting construction is provided at the opposite side of the proofer structure, whereby the tracks provide guides along which the rollers 35 and 36 at opposite ends of the racks 12 are adapted to roll in moving the racks 12 along the upper and lower runs 13 and 14.

Each of the racks 12 is also provided on one side with a plurality of lugs 43 arranged to engage an adjacent rack to provide suitable spacing between adjacent racks 12 as they are moved along the upper and lower tracks 37 and 38 of upper and lower runs 13 and 14, respectively.

Elevating means

As previously stated, elevating means 18 raises the racks 12 from the lower run 14 to the upper run 13 through the loading and unloading station 17, and includes a pair of endless chains 44 disposed in parallel vertical laterally spaced planes sufficiently far apart to receive a rack 12 therebetween. Figures 2 and 3 show a chain 44 on one side of the proofer, and referring thereto, the chain 44 is trained around sprockets 45, which sprockets are fixed on short transverse shafts 46 mounted in bearings 47 carried by the inner and outer frame members 41, 42. The chain 44 carries a pair of diametrically opposite lugs 48 and 49 adapted to engage the pin 32 of a rack 12. This chain and sprocket arrangement is duplicated on the opposite side of the proofer.

The sprockets 45 and the chains 44 entrained thereover are so disposed to provide in the elevating means 18, referring particularly to Figures 1 and 3, a horizontal forwardly traveling run 50 for moving a rack 12 along the forward end portion of lower tracks 38 into the loading and unloading station 17; a vertical accending run 51 for raising a rack 12 through the loading and unloading station 17 between the unloading pusher 23 on one side and the loading pusher 21, the loading conveyor 20 and the unloading conveyor 22 on the other side; a horizontal rearwardly traveling run 52 for moving a rack 12 from the loading and unloading station 17 onto the end of the upper tracks 37; and a descending slightly rearwardly sloping return run 53.

The diametrically opposite outwardly projecting lugs 48, 49 of the chains 44 are adapted to engage the outer end portions of the pins 32 of the racks 12. As shown in Figures 1 and 3 rack 12a is being raised through the loading and unloading station 17 by reason of engagement of its pins 32 by the lugs 49 of the chains 44. On reaching the top of run 51, the rack 12a will be pushed along run 52 onto tracks 37 where it will engage and push rack 12b ahead of it and consequently all the racks 12 in upper run 13 will be pushed along the upper tracks 37. When rack 12a reaches the position occupied by rack 12b in Figures 1 and 3, it will remain there by reason of disengagement of lugs 49 from the pins 32 of rack 12a as the lugs 49 move downwardly to descending return run 53. In the interim that lugs 49 are moving rack 12a, as above explained, the lugs 48 move downwardly along descending run 53 to horizontal forwardly traveling run 50, where they engage the pins 32 of rack 12s, moving the rack 12s forwardly along tracks 38 into the loading and unloading station 17 and then upwardly through the loading and unloading station 17. All the racks 12 in lower run 14 are moved forward by means and in a manner to be later described, so that rack 12r will now occupy the space vacated by rack 12s. Also as these events are occurring, rack 12j, referring to Figure 1A, will be moved by lowering means 33 through rack lowering station 34 into the position occupied by rack 12k, as later described in detail.

The means for operating the elevating means 18 includes a through countershaft 56, see Figure 1, which is rotated by an electric motor M1 through a suitable sprocket and chain drive, indicated by the numeral 57. A sprocket chain 60 trained around a sprocket on countershaft 56 and a sprocket 61 fixed on an extension of one of the short transverse shafts 46 on one side of the elevating means 18, operatively connects the countershaft 56 with the chain 44. A similar sprocket and chain connection is provided between countershaft 56 and a short tranverse shaft 46 at the opposite side of the proofer.

Referring to Figures 2 and 3, a guide plate 62 is provided along the ascending run 51 of the chain 44 at the inner side thereof and is supported from the inner frame member 41 by any suitable means such as the brackets 63. Another guide plate 64 is provided along the ascending run 51 of the chain 44 at the outer side thereof and spaced therefrom to form a passage 65 adapted to receive the lugs 48 and 49 of the chain 44 and the pins 32 of the racks 12, the guide plate 64 being supported from the inner frame member 41 by suitable means, such as brackets 66. Similar guide plates are provided for the chain 44 at the opposite side of the elevating means 18.

Loader pusher

Referring particularly to Figures 1, 4 and 5, the pusher 21 includes a rectangular supporting frame 67 having a pair of tranversely extending angle irons 68, one adjacent the front wall 19 of the proofer and the other adjacent the path of the racks 12 as they move along the ascending run 51 of the elevating means 18, and a pair of longitudinally extending laterally spaced plate members 69 secured to the angle irons 68. Depending from the ends of the plate members 69 adjacent their inner sides are brackets 70 carrying the longitudinally extending transversely spaced hollow support tubes 71. A pusher or ram 72 is adapted to be pendently supported from and to roll along the support tubes 71 toward and away from the racks elevated through the loading and unloading station 17. The pusher 72 has a transversely extending pusher element 73 secured to a pair of transversely spaced plate members 74, each of which plate members carries tandem arranged upper and lower sets of concave rollers 75, which roll along the upper and lower portions of the support tubes 71.

Fore and aft of the hollow support tubes 71 and spaced laterally outwardly therefrom are pairs of transversely spaced bearings 76 pendently supported in suitable manner from the plate members 69, in each of which pair of bearings 76 is journaled a short transverse shaft 77. Fixed on the inner end of each of the shafts 77 is a sprocket 78 and around the pair of sprockets 78 at the side of each of the hollow support tubes 71 is trained a chain 79. Each of the plate members 74 of the pusher 72 is provided with a laterally outwardly projecting stub shaft 80 and each of the chains 79 has attached thereto one element of a flexible coupling 81. A pivotal link 82 connects each of the stub shafts 80 with another element of a respective flexible coupling 81. It is thus apparent that when the chains 79 travel in the direction of the arrow in Figure 5, they act through the links 82 to first push the pusher 72 from the solid to the broken line position causing pusher element 73 to transfer a row of pan sets 83 from the loading conveyor 20 onto a rack shelf aligned with the loading conveyor 20 and thereafter to return the pusher 72 to its original or inoperative position.

Two aligned opposite transverse shafts 77 have fixed on their ends opposite the sprockets 78, additional sprockets 84, over which sprockets 84 and two sprockets of a group of sprockets indicated by the numeral 85 in Figure 1 are trained chains 86. The group of sprockets 85 are fixed on a through shaft 87 which is rotated by motor M2 through a chain 88 trained around a third sprocket of the group of sprockets 85 and a sprocket 89.

Unloader pusher

Referring particularly to Figures 1, 6 and 7, pusher 23 includes a rectangular supporting frame 90 having a pair of transversely extending longitudinally spaced angle irons 91 and a pair of longitudinally extending laterally spaced plate members 92 secured to the angle irons 91. Depending from a plurality of points along the plate members 92 adjacent their inner sides are brackets 93, each of which brackets supports a concave upper roller 94 and a concave lower roller 95. Supported between the respective upper and lower rollers 94, 95 under the respective plate members 92 are a pair of longitudinally extending hollow tubes 96 arranged for fore and aft movement. The forward ends of the tubes 96 are joined by a transversely extending pusher element 97.

Pendently supported from each of the plate members 92 fore and aft thereof and adjacent the outer sides thereof are pairs of transversely spaced bearings 98, in each of which pair of bearings 98 is journaled a short transverse shaft 99. Fixed on the inner end of each of the shafts 99 is a sprocket 100 and around the pair of sprockets at each side of the pusher is trained a chain 101. Each of the hollow tubes 96 is provided with a laterally projecting stub shaft 102 and each of the chains 101 has attached thereto one element of a flexible coupling 103. A pivotal link 104 connects each of the stub shafts 102 with another element of a respective flexible coupling 103. It is thus apparent that when the chains 101 travel in the direction of the arrow in Figure 6, they act through the links 104 to push the tubes 96 and pusher element 97 across a rack shelf aligned with the unloading conveyor 22 to transfer a row of pan sets onto the unloading conveyor 22 and thereafter to return the pusher to its original or inoperative position.

Two aligned opposite transverse shafts 99 have fixed on their ends opposite the sprockets 100, additional sprockets 105, over which sprockets 105 and two sprockets 106 on a transverse through shaft 107 are trained chains 108. Shaft 107 is rotated by motor M3 through a suitable sprocket and chain drive indicated in Figure 1 by the numeral 109.

*Rack lowering means*

As previously stated, lowering means 33 lowers the racks 12 from the upper run 13 to the lower run 14 through the rack lowering station 34 and includes a pair of endless chains 110 disposed in parallel vertical laterally spaced planes sufficiently far apart to receive a rack 12 therebetween. Figures 8 and 9 show a chain 110 on one side of the proofer, and referring thereto, the chain 110 is trained around sprockets 111, which sprockets are fixed on short transverse shafts 112 mounted in bearings 113 carried by the inner and outer frame members 41, 42. This chain and sprocket arrangement is duplicated on the opposite side of the proofer.

The sprockets 111 and the chains 110 entrained thereover are so disposed to provide in the lowering means 33, referring particularly to Figures 1A and 9, a horizontal rearwardly traveling run 114 for moving a rack 12 from the upper tracks 37 into the rack lowering station 34; a vertical descending run 115 for lowering a rack through the rack lowering station 34 onto the lower tracks 38; a horizontal forwardly traveling run 116 for moving a rack forwardly along the lower track 38; and an ascending slightly forwardly sloping return run 117.

The chains 110 are each provided with an outwardly projecting lug 118 adapted to engage the outer end portion of a respective pin 32 of a rack 12. Referring to Figure 1A, the lugs 118 are shown in the inoperative position of the chains 110. When the chains 110 are operated, as later explained, the lugs 118 move to the rearwardly traveling run 114 where they engage the pins 32 of rack 12j, moving it rearwardly into the rack lowering station 34. In Figure 9, rack 12j is shown in full lines moved rearwardly from its position as shown in Figure 1A and is about to pass to the descending run 115 of the chains 110.

The means for supporting the racks 12 along the descending run 115 will be described with reference to one of the chains 110, it being understood that the other of the chains 110 is provided with similar means. Pivotally mounted on extensions of one of the pins 119 of chain 110 and at opposite sides of the chain 110 just ahead of the lug 118 are triangular shaped plate like elements 120 forming a latch 121. Pivotal movement of the latch 121 is limited by reason of engagement of extensions of another pin 122 of chain 110 in slots 123 at the free end of the pivoted plate like elements 120 of the latch 121. A guide plate 124 is provided along the descending run 115 of the chain 110 at the inner side thereof and is supported from the inner frame member 41 by any suitable means such as the brackets 125. Another guide plate 126 is provided along the descending run 115 of the chain 110 at the outer side thereof and spaced therefrom to form a passage 127 adapted to receive the lug 118 of chain 110, the pins 32 of the racks 12, and the latch 121 in its extended position wherein it is adapted to engage the rack pin 32 and support the rack 12 during its descent from upper run 13 to lower run 14. The outer guide plate 126 is suitably supported from the inner frame member 41 as by brackets 128. Similar guide plates are provided for the chain 110 at the opposite side of the lowering means 33. In Figure 9 rack 12j and the supporting means therefor is shown in phantom as rack 12j is being lowered.

The upper end portion of each of the inner guide plates 124 is provided with a curved cam section 129 adapted to engage the latch 121 of a respective chain 110, to move it from retracted to extended position. The lower end portion of each of the outer guide plates 126 is provided with a hinged curved section 130 normally retained in the position shown in full lines in Figure 9 by a counterweight 131 or other suitable means. The free end of the hinged member 130 is bifurcated so that the chain 110 is adapted to be received between the prongs thereof. The reason for hinging the member 130 will become apparent later in the description. As the rack 12j reaches the bottom of the descending run 115; the latch 121, pin 32 and lug 118 depress the hinged member 130 to the position shown in phantom in Figure 9, the movement of hinged member 130 being limited by engagement of the counterweight 131 with a stop member 132, preferably formed of a resilient material to cushion the impact. The rack 12j is thus delivered to the lower run 14, and is supported on the lower tracks 38 by reason of engagement therewith of the rollers 35 and 36 of the rack. By reason of engagement of lug 118 of chain 110 with the rack pin 32, rack 12j is moved forwardly along the tracks 38 whereupon it will engage and push rack 12k ahead of it and of course all other racks along lower run 14 are moved ahead one rack position. In Figure 9 rack 12j is shown in phantom approaching the end of the run 116 of chain 110, whereupon lug 118 disengages rack pin 32 and the rack pin 32 and latch 121 travel upwardly along return run 117 to the position shown in full lines in Figure 1A and in phantom in Figure 9, in which position the chain 110 will stop ready for another cycle of operation. The control means for the chain 110 will be described later in the description in connection with the electrical diagram, Figure 14.

The chains 110 are driven from a motor M4 which is connected with and rotates a transversely extending through countershaft 133 through a suitable sprocket and chain drive indicated in Figure 1A by the numeral 134. On an extension of one of the short transverse shafts 112 of the rack lowering means 33, as shown in Figure 8, is a sprocket 134, around which sprocket 134 and a sprocket on the countershaft 133 is trained a chain 135 for operatively connecting countershaft 133 with the chain 110. A similar chain and sprocket connection is provided between countershaft 133 and a short transverse shaft 112 at the opposite side of the proofer.

*Rack conveyor to and from storage chamber*

When a slow proof time dough is followed by a quicker proof time dough, as will later be described in detail, or when it is desired to inspect, repair or replace a rack, the invention provides means for moving one or more empty racks into storage chamber 16 from which chamber the racks can be conveniently withdrawn through suitable doors at the end of the chamber. This includes endless conveying means 136 which will now be described in detail with particular reference to Figures 1A, 10 and 11. By remote control means, hereinafter described, the conveying means 136 is automatically rendered operative to move one, two three or four racks occupying any of the positions of racks 12b to 12j in Figures 1 and 1A, into storage chamber 16 upon reaching the position shown in Figure 1A occupied by rack 12k.

The conveying means 136 includes a pair of endless chains, one at each outer side of and extending along the lower tracks 38, which tracks extend through the rack lowering station 34 into the rack storage chamber 16. As shown in Figure 1A, the conveying means 136 is disposed with its top run below the lower run 116 of the rack lowering means 33 to provide a space therebetween to freely receive the pins 32 of the racks 12, and extends rearwardly a short distance into rack storage chamber 16. The conveying means 136 will be described with reference to Figures 10 and 11 which show the details thereof at one side of the proofer, it being understood that they are duplicated at the opposite side of the proofer. The endless chain 137 of the conveying means 136 is trained around the tandem arranged sprockets 138, which sprockets 138 are fixed on short transverse shafts 139 rotatably mounted in bearings 140 carried by the inner and outer frame members 41 and 42 of the proofer. Carried by the chain 137 is an outwardly projecting lug 141 which when moving toward the left as viewed in Figure 1A along the top run, engages the rack pin 32 of a rack 12 occupying the position of rack 12k, moving the rack rearwardly into the storage chamber 16 along the tracks 38. The reason for the hinged curved section 130 of the lowering means guide plate 126, previously described, is now apparent. In the normally raised position of hinged guide plate section 130, the pins 32 of the racks 12 can freely pass thereunder as the racks are moved into the storage chamber 16 by the conveyor 136.

Figure 10:
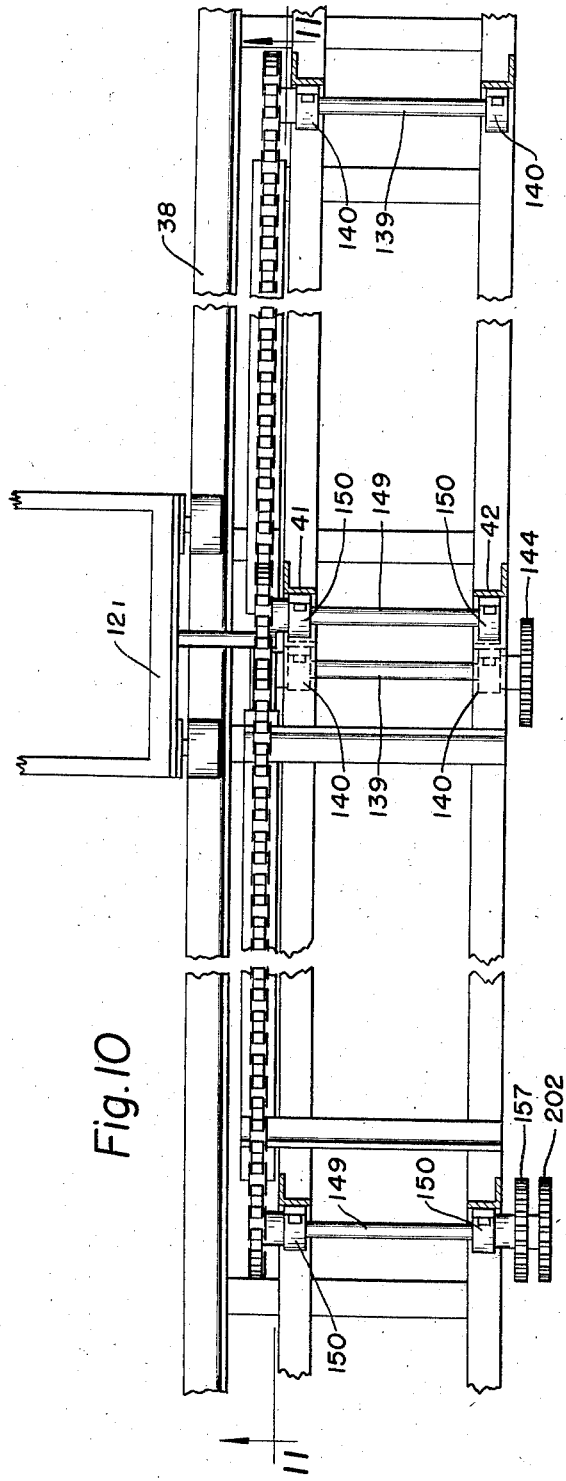
Figure 10 is a fragmentary view of the proof box showing in plan the conveying means at one side thereof for moving the racks to and from the proofing chamber of the proof box and the rack storage compartment.

The chains 137 of the conveyor 136 are driven from a motor M5 which is connected with and rotates a transversely extending through countershaft 142 through a suitable sprocket and chain drive indicated in Figure 1A by the numeral 143. On an extension of one of the short shafts 139, as shown in Figure 10, is a sprocket 144, around which sprocket 144 and a sprocket on the countershaft 142 is trained a chain 145 for operatively connecting countershaft 142 with the chain 137. A similar chain and sprocket connection is provided between countershaft 142 and the short transverse shaft 139 at the opposite side of the proofer.

The motor M5 is a reversible motor and is arranged, as later explained, to reverse the direction of travel of the conveyor 136, so that the lugs 141 of the chains 137, when moving toward the right as viewed in Figure 1A along the top run, engage rack pins 32 of a rack 12 occupying the position of rack 12o, moving the rack forwardly from the storage chamber 16 into the position occupied by rack 12k, or in other words into the closed loop of the proofing chamber 11.

Storage chamber conveyor

In storage chamber 16 is provided a conveyor 146 for moving racks 12 ahead to successively occupy the position of rack 12o in Figure 1A where they are adapted to be advanced by the conveyor 136, as previously described, and returned to the closed loop of the proofing chamber 11. By control means hereinafter described, a predetermined number of racks 12 are adapted to be moved from the storage chamber 16 into the closed loop of the proofer chamber 11. The conveying means 146 extends longitudinally through the storage chamber 16, being disposed above the level of the tracks 38 and having the forward portion thereof in overlapping vertically alined spaced relation with respect to the rearward portion of conveyor 136.

Figure 11:
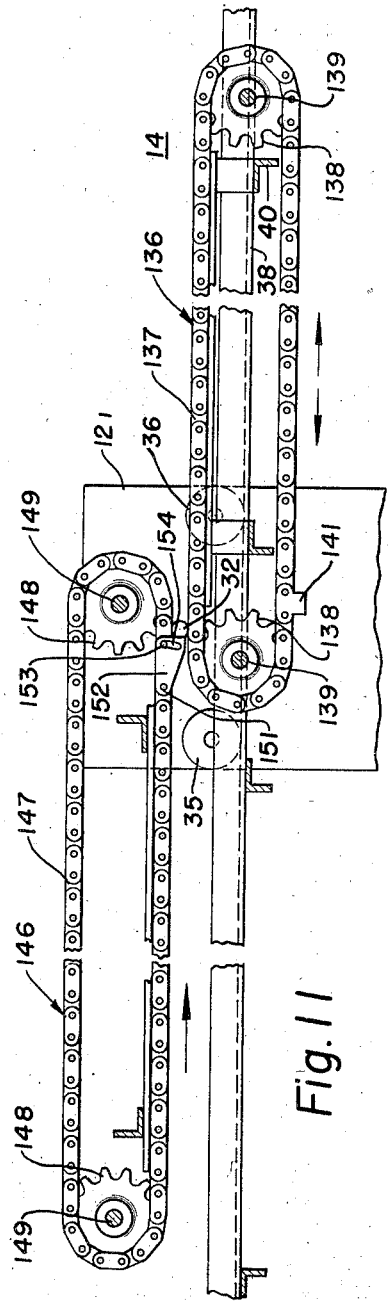
Figure 11 is a sectional view taken on the line 11—11 of Figure 10.

The conveying means 146 will be described with reference to Figures 10 and 11 which show the details thereof at one side of the storage chamber 16, it being understood that they are duplicated at the opposite side of the chamber. The endless chain 147 of the conveying means 146 is trained around the tandem arranged sprockets 148, which sprockets 148 are fixed on short transverse shafts 149 rotatably mounted in bearings 150 carried by the inner and outer frame members 41 and 42. Pivotally mounted on extensions of one of the pins 151 of the lower run of chain 147 and at opposite sides thereof are triangular shaped plate like elements forming a pusher member 152. Pivotal movement of pusher member 152 is limited by reason of engagement of extensions of another pin 153 of chain 147 in slots 154 at the free end of the pusher member 152.

Referring to Figure 1A, pusher member 152 is shown engaging rack pin 32 of rack 121 and upon movement of the lower run of chain 147 to the right, the rack 121 is advanced. The control means, to be described, selectively stops the conveyor 146 when the pusher members 152 have advanced rack 121 one, two or three rack positions. Assume now that rack 121 has reached the position occupied by rack 12o, in other words it has reached the position shown in Figure 11 where it is ready to be pushed ahead by lugs 141 of conveyor 136. As the lugs 141 move upwardly around the sprocket 138 to the upper run of the conveyor 136, they displace the pivotally mounted pusher members 152 to engage the pins 32 of rack 121 to move it forwardly, after which the pivotally mounted pusher members 152 are free to drop back by gravity to the position shown in Figure 11.

When the direction of travel of the conveyor 136 is reversed, as previously explained, to move racks 12 into the storage chamber 16, the rack pins 32 engage the pusher members 152 of conveyor 146, whereupon as succeeding racks are pushed into the storage chamber the direction of travel of the conveyor 146 is reversed until the pusher members 152 again reach the position shown in Figure 1A.

The chains 147 are arranged to be motor driven in one direction only, i. e., in a direction to move the racks 12 forward, by a motor M6. The motor M6 is connected with and rotates a transversely extending through countershaft 155 through a suitable sprocket and chain drive indicated in Figure 1A by the numeral 156. On an extension of one of the short shafts 149, as shown in Figure 10, is a sprocket 157, around which sprocket 157 and a sprocket on the countershaft 155 is trained a chain 158 for operatively connecting countershaft 155 with the chain 147. A similar chain and sprocket connection is provided between countershaft 155 and the short transverse shaft 149 at the opposite side of the proofer.

Lower run conveyor

Extending along lower run 14 above the level of the tracks 38 is a conveyor 159. This conveyor performs no necessary function when the proofer is operating with a full complement of racks in the closed loop, and can be rendered inoperative at such times if desired. However, when less than a full complement of racks is in the closed loop, in other words, one or more racks are delivered to the storage chamber 16, for example when a slow proof time dough is followed by a faster proof time dough, then the conveyor 159 serves a definite purpose. Under these circumstances, the conveyor 159 moves the racks ahead to take up the space vacated by the racks in the storage compartment, as will be hereinafter more particularly described.

The conveyor 159 will be described with reference to Figures 12 and 13 which show the details thereof at one side of the proofer, it being understood that they are duplicated at the opposite side of the proofer. Endless chain 160 of conveyor 159 is trained around tandem arranged sprockets 161, which sprockets 161 are fixed on short transverse shafts 162 rotatably mounted in bearings 163 carried by the inner and outer frame members 41 and 42. Pivotally mounted on extensions of a plurality of pins 164, four as shown in Figures 1, 1A, of the chain 160 and at opposite sides thereof are triangular shaped plate like elements forming pusher members 165. Pivotal movement of pusher members 165 is limited by reason of engagement of extensions of other pins 166 of chain 160 in slots 167 at the free ends of the pusher members 165.

With the lower run of the chain 160 moving to the right as viewed in Figures 1, 1A and 13, it will be seen that the pusher members 165 engage the rack pins 32 moving the racks 12 along the tracks 38. The pivotal movement of the pusher members 165 permits the pins 32 of the racks 12 to pass by the pusher members 165 when the conveyor 160 is inoperative, for example, when the proofer is being operated with a full complement of racks in the closed loop.

The chains 160 of the conveyor 159 are driven from a motor M7 which is connected with and rotates a transversely extending through countershaft 168 through a suitable sprocket and chain drive indicated in Figure 1 by the numeral 169. On an extension of one of the short shafts 162, as shown in Figure 12, is a sprocket 170, around which sprocket 170 and a sprocket on the countershaft 168 is trained a chain 171 for operatively connecting countershaft 168 with the chain 160. A similar chain and sprocket connection is provided between countershaft 168 and the short transverse shaft 162 at the opposite side of the proofer.

Operation

The operation of the proofer will now be described with particular reference to Figures 1, 1A and the electrical diagram, Figure 14, and it will be assumed it is operating with a full complement of racks in the closed loop, in other words slow proof time dough is being run through the proofer. Assume further, as a specific example, that a proof time of 66½ minutes is desired. There being 19 racks in the proofer, this means that every 3½ minutes a rack 12 must move from the position shown occupied by rack 12s through the loading and unloading station 17 and into the position shown occupied by rack 12b. Since there are 7 shelves to a rack, a cycle of events must occur every 30 seconds during this 3½ minute period, which cycle is controlled by a timer 172 in the unloading pusher motor circuit, as will become apparent from the following description.

Figure 14:
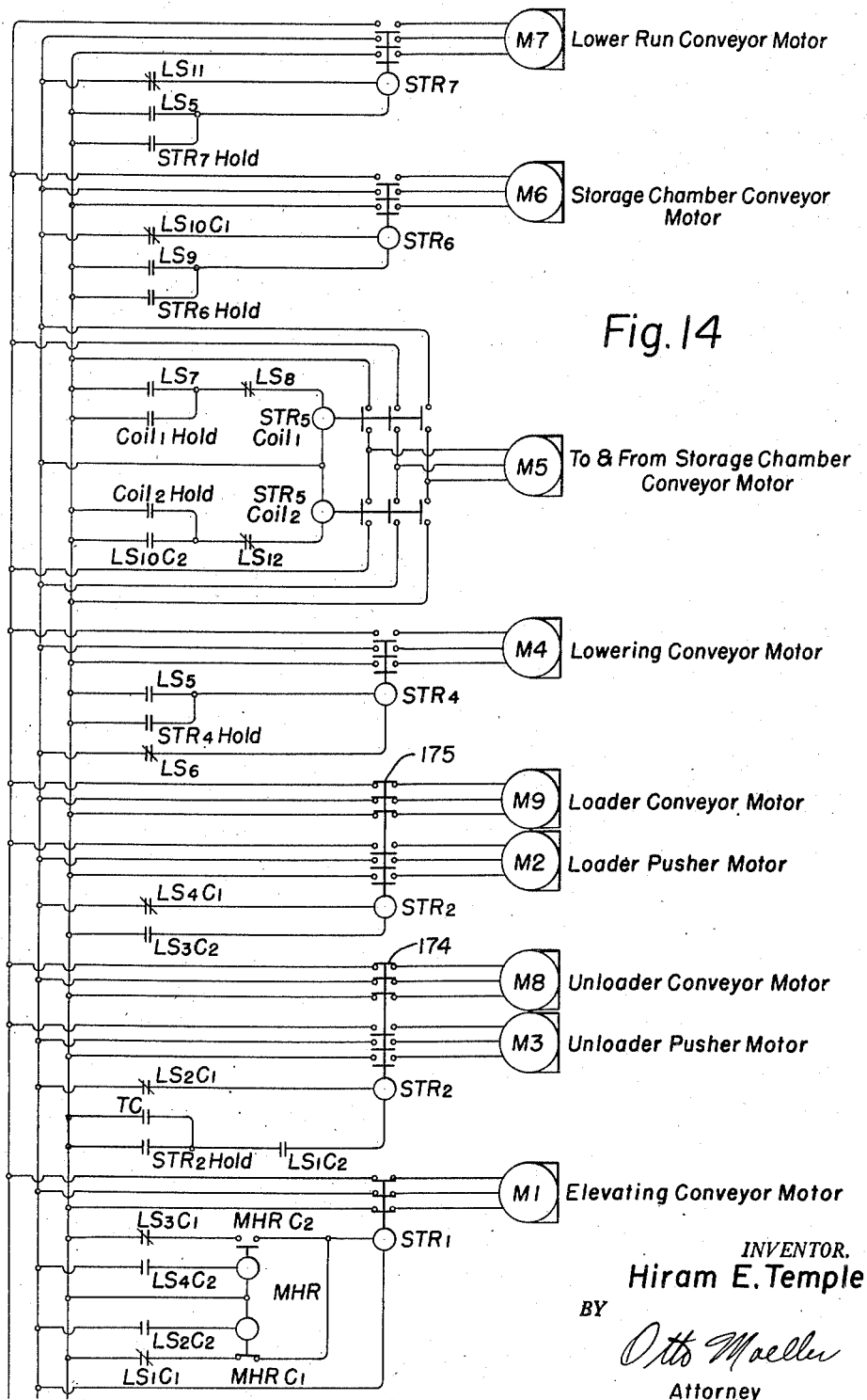
Figure 14 is a diagram of the electrical control system.

Assuming that rack 12a has just left the position shown occupied in Figure 1 by rack 12s, then, as shown in Figure 14, a circuit is completed through normally closed contact $C_1$ of limit switch $LS_1$ and contact $C_1$ of mechanically held relay MHR to starter $STR_1$, causing elevator motor M1 to run.

Now, when the top shelf 24 of rack 12a registers with unloading conveyor 22, the pin 24a of rack shelf 24 opens contact $C_1$ of limit switch $LS_1$, breaking the circuit to starter $STR_1$ and thereby causes elevator motor M1 to stop. At the same time, normally open contact $C_2$ of limit switch $LS_1$ is closed by pin 24a, this contact being in a circuit to unloading pusher motor M3 and unloading conveyor motor M8. At this particular time, timer control contact TC and starter hold contact $STR_2HC$ are open. The timer 172 is arranged to momentarily close contact TC at 30 second intervals, so that when contact TC momentarily closes, a circuit is completed through normally closed contact $C_1$ of limit switch $LS_2$, contact $C_2$ of limit switch $LS_1$ and timer contact TC to starter $STR_2$, causing unloading pusher motor M3 to run. Momentary closing of this circuit causes starter hold contact $STR_2HC$ to close whereby the circuit to starter $STR_2$ is now maintained by normally closed contact $C_1$ of limit switch $LS_2$, contact $C_2$ of limit switch $LS_1$ and starter hold contact $STR_2HC$ to maintain operation of unloading pusher motor M3 even though the momentarily closed timer contact TC is now open. Also, upon completing the circuit to starter $STR_2$ to operate the unloading pusher motor M3, the circuit through contacts 174 to the unloading conveyor motor M8 is broken to stop the unloading conveyor 22. The unloading conveyor motor M8 is shown only in the electrical diagram, Figure 14, while the drive connection between motor M8 and the unloading conveyor 22 is not illustrated since such drive connections are conventional in the conveyor art. The unloading pusher 23 now operates to push a row of pan sets from the rack shelf 24 onto the unloading conveyor 22.

At the end of the return stroke of the unloading pusher 23, the lug 173 carried thereby engages and overruns contact $C_1$ of limit switch $LS_2$. Upon such momentary engagement, normally closed contact $C_1$ of limit switch $LS_2$ opens to break the circuit to starter $STR_2$ thereby stopping unloading pusher motor M3 and starting unloading conveyor motor M8. The momentary opening of contact $C_1$ of limit switch $LS_2$ breaking the circuit to starter $STR_2$, opens starter hold contact $STR_2HC$, so that even though normally closed contact $C_1$ of limit switch $LS_2$ has reclosed, the circuit to starter $STR_2$ remains broken.

At the same time, a normally open second contact $C_2$ of limit switch $LS_2$ is momentarily closed by the lug 173 energizing mechanically held relay MHR, moving it to open its contact $MHRC_1$ and close its contact $MHRC_2$, whereupon a circuit to starter $STR_1$ is completed through normally closed contact $C_1$ of limit switch $LS_3$, causing the elevator motor M1 to run.

Now, when the top shelf 24 of rack 12a registers with loading conveyor 22, the pin 24a of rack shelf 24 opens contact $C_1$ of limit switch $LS_3$, breaking the circuit to starter $STR_1$, thereby causing elevator motor M1 to stop. It is to be noted that the distance between two successive shelves of the racks 12 is slightly greater than the distance between the loading conveyor 20 and unloading conveyor 22, so that in our present example when rack shelf 24 registers with loading conveyor 20, its pin 24a engages limit switch $LS_3$, while rack shelf 25 will be slightly below the conveying surface of unloading conveyor 22 so that its pin 25a will not have reached limit switch $LS_1$. At the same time that the pin 24a opens normally closed contact $C_1$ of limit switch $LS_3$ to stop the elevator motor, a normally open contact $C_2$ of limit switch $LS_3$ is closed, thereby closing a circuit to starter $STR_3$ through contact $C_2$ of limit switch $LS_3$ and normally closed contact $C_1$ of a limit switch $LS_4$, whereby loading pusher motor M2 will run. Also, upon completing the circuit to starter $STR_3$ to operate the loading pusher motor M2, the circuit through contacts 175 to the loading conveyor motor M9 is broken to stop the loading conveyor 20. The loading conveyor motor M9 is shown only in the electrical diagram, Figure 14, while the drive connection between motor M9 and the loading conveyor 20 is not illustrated since such drive connections are conventional in the conveyor art. The loading pusher 21 now operates to push a row of pan sets from the loading conveyor 20 onto the rack shelf 24 of rack 12a.

At the end of the return stroke of the loading pusher 21, the lug 176 carried thereby engages and overruns contact $C_1$ of limit switch $LS_4$. Upon such momentary engagement, normally closed contact $C_1$ of limit switch $LS_4$ opens to break the circuit to starter $STR_3$ thereby stopping loading pusher motor M2 and starting loading conveyor motor M9 to bring another row of pans in position to be loaded on the next shelf 25 of rack 12a. At the same time, a normally open second contact $C_2$ of limit switch $LS_4$ is momentarily closed by the lug 176 energizing mechanically held relay MHR, moving it to open its contact MHRC₂ and close its contact MHRC₁, whereupon a circuit to starter STR₁ is completed through normally closed contact C₁ of limit switch LS₁, causing the elevator motor M1 to run.

Now, when the shelf 25 of rack 12a registers with unloading conveyor 22, the above described cycle of events is repeated when the timer contact TC is again closed by timer 172 at the beginning of the next 30 second period. This cycle of events is repeated for each shelf of the rack 12a, and each shelf of each succeeding rack 12 as it goes through the loading and unloading station 17.

When the last shelf 30 of rack 12a has been loaded and the elevating means 18 starts moving, lug 48 is in position to move rack 12s into the loading and unloading station 17 until its top shelf registers with unloading conveyor 22, whereupon the elevating means 18 stops, as described above in the explanation of the operation of rack 12a. The speed of the elevating means 18 must of course be such that the rack 12s will reach the position where its top shelf registers with unloading conveyor 22 prior to the expiration of the 30 second period for which the timer TC is set in our specific example, so that it will be in position to be unloaded by the unloading means 23, the operation of which is initiated by the timer.

While rack 12s is being moved to such position in the loading and unloading station 17 by lug 48, rack 12a is moved by lug 49 to the position occupied by rack 12b, as previously explained, thereby pushing all the racks 12 in upper run 13 ahead one rack space. As the rack 12a moves along the upper horizontal run of the elevating means 18 toward the rack 12b, its pin 24a engages and momentarily closes normally open limit switch LS₅ which completes a circuit through limit switch LS₅ and normally closed limit switch LS₆ to starter STR₄ to operate the motor M4 for the rack lowering means 33. Momentary closing of his circuit causes starter hold contact STR₄HC to close whereby the circuit to starter STR₄ is now maintained through normally closed limit switch LS₆ and starter hold contact STR₄HC to maintain operation of lowering means motor M₄ even though momentarily closed limit switch LS₅ is now open.

Upon operation of the lowering means 33, the lug 118 engages the pin 32 of rack 12j, and the rack 12j will be moved into a position displacing rack 12k, as set forth above in the detailed description of the lowering means 33. After the lug 118 leaves the pin 32 of rack 12j and travels along the return run it engages and overrides normally closed limit switch LS₆, thereby momentarily opening limit switch LS₆ breaking the circuit to starter STR₄ and opening starter hold contact STR₄HC, whereby lowering means motor M4 will stop. The lowering means 33 is then in position for another cycle of operation with another rack 12. When rack 12j displaces rack 12k, all the racks in lower run 14 are pushed ahead one rack space, so that rack 12r will assume the position of rack 12s in position to be engaged by the elevating means 18.

The operation has been described with reference to a full complement of racks 12 in the closed loop of the proofer, in other words slow proof time dough, 66½ minutes in our specific example is being delivered to the proofer. At the end of this run, let it be assumed that it is to be followed by a fast proof time dough, for example, a 52½ minute proof time dough. Since, as explained above, a rack goes through the loading and unloading cycle every 3½ minutes, the operator permits four empty racks to follow the last slow proof time dough rack. These four empty racks are arranged to be automatically moved into the storage chamber 16 when they reach the position shown occupied in Figure 1A by rack 12k, by mechanical means previously described and control means to be described. The fast proof time dough racks will now be speeded through the space vacated by the empty racks in the storage chamber, by the lower run conveyor 159 as previously described. However, the racks of fast proof time dough will still travel through the loading and unloading zone in the same 3½ minute period as before, only their travel along the lower run 14 having been accelerated. If instead of a 52½ minute proof time dough, a 56 minute proof time dough is to follow the 66½ minute proof time dough, then only three empty racks are abstracted from the closed loop, and abstracting two racks would provide for a 59½ minute proof time dough, and abstracting one rack would provide for a 63 minute proof time dough.

Figure 16:
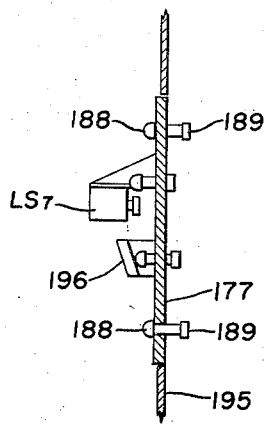
Figure 16 is a sectional view taken on the line 16—16 of Figure 15.
Figure 15:
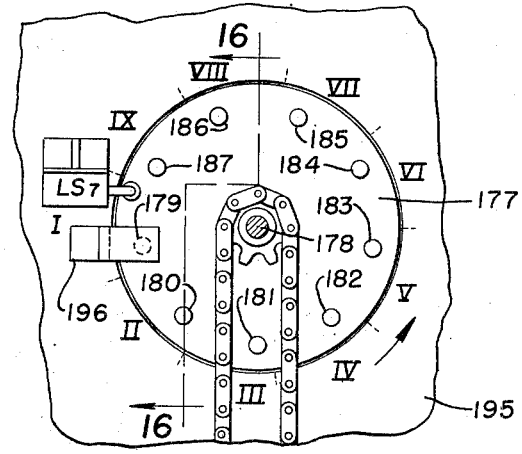
Figure 15 is a view in elevation of the selector means for controlling the conveyance of desired racks from the proofing chamber to the rack storage compartment and vice versa.

The control means includes a disc 177, as shown in Figures 1, 15 and 16 secured to a short transversely extending shaft 178. The shaft 178 is preferably journaled in suitable bearings carried by the inner and outer frame members of the proofer, the mounting of shaft 178 being similar to the mounting of the shafts 46 of elevating means 18, it has not been shown in the drawings. Extending through the face of the disc 177 near the periphery thereof are a number of equidistantly spaced pins 179 to 187, equalling the number of racks 12 in the upper run 13, nine in the present instance, and corresponding respectively to the positions occupied by racks 12b to 12j in Figures 1 and 1A. The pins 179 to 187 having a sliding fit in the disc 177 and are provided at one end with enlarged rounded buttons 188 and at the other end with enlarged heads 189, limiting movement of the pins. The disc 177 is adapted to be rotated and is operatively connected with the elevating means 18 so that it rotates in timed relation with movement of the elevating means. For this purpose, a sprocket 190 is mounted on an extension of one of the short shafts 46 of the elevating means 18, Figure 2. A sprocket and chain drive, indicated in Figure 1 by the numeral 191, connects the sprocket 190 with a gear reducer 192, and the gear reducer 192 is in turn connected with a sprocket 193 on the disc shaft 178 by a sprocket and chain drive, indicated by the numeral 194.

The panel 195 surrounding disc 177 is marked off into nine equal divisions starting from limit switch LS₇, the spaces I, II, III, IV, V, VI, VII, VIII and IX representing respectively, the positions occupied by racks 12b to 12j in Figures 1 and 1A. Reduction gearing 192 is such that a pin 179 to 187 traverses one of the divisions I to IX, in the time required for a rack 12 to go through a complete loading and unloading cycle.

Now if the operator desires to have four racks move into the storage compartment 16, as in our specific example, he permits four empty racks to pass through the loading and unloading zone 17 as previously stated. When these four empty racks are in the positions shown occupied in Figure 1 by racks 12b, 12c, 12d and 12e, the operator pushes in the pins of disc 177 that lie within the spaces I, II, III and IV respectively, in the present instance pins 179, 180, 181 and 182. As the racks 12b, 12c, 12d and 12e move ahead a rack space at a time, the pins 179, 180, 181 and 182 move ahead through one of the divisions I to IX after another. When rack 12e has reached the space occupied in Figure 1A by rack 12k, pin 182 will have advanced to a position where it engages normally open limit switch LS₇. Momentary closing of limit switch LS₇ completes a circuit to Coil₁ of starter STR₅ through limit switch LS₇ and normally closed limit switch LS₈, causing conveyor motor M5 to run in a direction such that lug 141 of conveyor 136 moves counterclockwise as viewed in Figures 1A and 11, engaging the rack pin 32 of rack 12e, which as stated above has now moved to the position occupied by rack 12k, and moves rack 12e into the storage chamber 16 to the position shown occupied by rack 12o. The momentary closing of limit switch LS₇ completing the circuit to the Coil₁ of starter STR₅ of conveyor motor M5 causes starter hold contact STR₅HC to close, thus maintaining the circuit after limit switch $LS_7$ opens whereby motor M5 continues to run. After the lug 141 has moved the rack 12e into the storage chamber 16, it momentarily engages and overruns normally closed limit switch $LS_8$. Such momentary engagement opens limit switch $LS_8$, breaking the circuit to $Coil_1$ of starter $STR_5$ and causes motor M5 to stop.

The same cycle of events occurs when each of the pins 181, 180 and 179 engages the limit switch $LS_7$, so that racks 12d, 12c and 12b are successively moved into the storage chamber 16, a succeeding rack pushing a preceding rack ahead of it. After the pins 179, 180, 181 and 182, which were pushed in, have contacted the limit switch $LS_7$ to perform their function of controlling the movement of the racks into the storage chamber, their button heads 188 engage a shoe 196 to move the pins back to their original position.

In the above example, let it be assumed that when the four empty racks assumed the positions occupied by racks 12b, 12c, 12d and 12e, that the operator forget to push in the pins 179, 180, 181 and 182. Let it further be assumed that these racks have advanced to the positions occupied by racks 12g, 12h, 12i and 12j, the operator may then have these racks enter the storage chamber by pushing in the pins in positions VI, VII, VIII and IX. Thus, as long as the operator knows what positions the empty racks occupy in the upper run 13, he can divert these racks into the storage chamber by depressing the pins in the corresponding spaces I to IX.

Assuming now that we have four racks in storage chamber 16, and let these racks be racks 12l, 12m, 12n and 12o as in Figure 1A. The racks 12l, 12m, 12n and 12o shown in phantom represent the normal position of these racks, which of course is now vacant. Rack 12p is the last rack of slow proof time dough and rack 12k is the first rack of the fast proof time dough. Now, as rack 12a moves through the loading and unloading zone 17, slow proof time dough is being unloaded from the rack and fast proof time dough is being loaded on the rack. When rack 12a has been loaded and is moved by the elevating means 18 along its top run 52, pin 24a momentarily engages and closes normally open limit switch $LS_5$ whereby a circuit to starter $STR_7$ is completed through limit switch $LS_5$ and normally closed limit switch $LS_{11}$ causing lower run conveyor 159 to be operated by motor M7. Momentary closing of limit switch $LS_5$ completing the circuit to starter $STR_7$ of conveyor motor M7, causes starter hold contact $STR_7HC$ to close, thereby maintaining the circuit after limit switch $LS_5$ opens to permit continued operation of motor M7.

One of the pusher members 165 of conveyor 159 will now advance rack 12p by reason of its engagement with the rack pin 32 of rack 12p, and racks 12q and 12r will be pushed ahead until rack 12r occupies the space vacated by rack 12s, which latter rack has in the meantime been moved into the loading and unloading station 17 by the elevator 18. When rack 12r reaches the space vacated by rack 12s, its pin 197 will engage and momentarily open normally closed limit switch $LS_{11}$ thereby breaking the circuit to starter $STR_7$ to render motor M7 inoperative and stopping the conveyor 159. While conveyor 159 is moving racks 12p, 12q and 12r ahead one rack space, lowering means 33 brings rack 12j down, which displaces rack 12k moving it ahead one rack space, so that the four rack vacancy has moved ahead one rack space. During the next cycle, rack 12p will move to the space shown occupied by rack 12r, rack 12i will be moved down to the lower run 14 and the four rack vacancy has moved ahead another rack space. Now, when the cycle is repeated, rack 12p will stay in rack position 12r until conveyor 159 has moved racks 12k, 12j and 12i through the four rack vacancy, whereupon rack 12p is pushed ahead by racks 12k, 12j and 12i into rack space 12s and upon contacting limit switch $LS_{11}$, the conveyor 159 is caused to stop as previously explained. It is understood, of course, that conveyor 159 travels rapidly enough to move racks 12k, 12j and 12i through the four rack vacancy and push rack 12p into rack position 12s in time to be picked up by the elevating means 18 so that there is always a rack in rack position 12s to go through the loading and unloading station 17. At this time the four rack vacancy will have returned to the position shown in Figures 1 and 1A and the above procedure is repeated.

By mechanical means previously described and control means to be described, the racks 12 in the storage chamber 16 may be reinserted into the closed loop of the proofer following any one of the racks in upper run 13. Assume, for purpose of illustration, the operator desires to move one or more of the four racks 12l, 12m, 12n and 12o from the storage chamber 16 into the closed loop to follow rack 12e.

The control means includes a disc 198, as shown in Figure 1. The disc 198 is mounted and constructed in the same manner as disc 177, and since the details of disc 177 are shown in Figures 15 and 16 and have been hereinabove described, reference may be had thereto. Disc 198 is rotated through sprocket and chain drive 199 from the same reduction gearing 192 as is disc 177.

Another control means including the disc 200, governs the number of racks 12l, 12m, 12n and 12o that it is desired to reinsert in the closed loop following rack 12e. This disc 200 is mounted and constructed in the same manner as disc 177 except that it has four pins 201 instead of the nine pins of disc 177. Disc 200 is adapted to be rotated and is operatively connected with the conveyor 146 so that it rotates in timed relation with movement of the conveyor 146. For this purpose a sprocket 202 is mounted on the same shaft 149 of conveyor 146 that carries the sprocket 157, as shown in Figure 10. A sprocket and chain drive, indicated in Figure 1A by the numeral 203, connects the sprocket 202 with a gear reducer 204, and the gear reducer 204 is in turn connected through a sprocket and chain drive 205 with the disc 200.

The four pins 201 are equidistantly spaced, their positions when four racks 12 are in the storage chamber being indicated by the position indicia I, II, III and IV, and the gearing to the disc 200 being such that a pin 201 will move from one position to a succeeding position while the racks in the storage chamber 16 move ahead one rack space.

Now, if the operator desires to reinsert only rack 12o into the closed loop following rack 12e, in our present example, he depresses the pin 201 of disc 200 that is in position I. He also depresses the pin 206 of disc 198 that is in position IV, it being understood that disc 198 is surrounded with position indicia I to IX corresponding to the position of the racks 12 in upper run 13, as described in connection with the disc 177. When rack 12e reaches the position occupied by rack 12k in Figure 1A, the depressed pin 206 of disc 198 will have moved around to momentarily engage and close normally open limit switch $LS_9$. A circuit to starter $STR_6$ is completed through limit switch $LS_9$ and a normally closed contact $C_1$ of limit switch $LS_{10}$ causing motor M6 to run and operating the storage chamber conveyor 146. Momentary closing of this circuit causes starter hold contact $STR_6HC$ to close whereby the circuit to starter $STR_6$ is now maintained through starter hold contact $STR_6HC$ and normally closed contact $C_1$ of limit switch $LS_{10}$.

Conveyor 146 operates to push racks 12l, 12m, 12n and 12o forwardly through engagement of pusher member 152 with rack pin 32 of rack 12l. However, the racks are pushed forward only a very short distance when the depressed pin 201 in position I of disc 200 engages and overrides contact $C_1$ of limit switch $LS_{10}$ breaking the circuit to starter $STR_6$ causing conveyor 146 to stop. Reclosing of normally closed contact $C_1$ of limit switch $LS_{10}$ when the pin overrides it does not restart the conveyor 146 since starter hold contact STR₆HC has been caused to open. At the same time, the depressed pin momentarily engages and closes a second contact C₂ of limit switch LS₁₀ completing a circuit to Coil₂ of starter STR₅ through contact C₂ of limit switch LS₁₀ and normally closed limit switch LS₁₂, causing conveyor motor M5 to run in a direction such that lug 141 of conveyor 136 moves clockwise as viewed in Figures 1A and 11, engaging the rack pin 32 of rack 12*o*, and moves rack 12*o* into the closed loop behind rack 12*e*, which rack 12*e* as stated above has by now moved to the position occupied in Figure 1A by rack 12*k*. The momentary closing of contact C₂ of limit switch LS₁₀ completing the circuit to the Coil₂ of starter STR₅ of conveyor motor M5 causes starter hold contact STR₅HC to close, thus maintaining the circuit after contact 2 of limit switch LS₁₀ opens. After the lug 141 has moved the rack 12*o* into the closed loop, it momentarily engages and overruns normally closed limit switch LS₁₂. Such momentary engagement opens limit switch LS₁₂, breaking the circuit to Coil₂ of starter STR₅ and causes motor M5 to stop.

If the operator, instead of depressing the pin 201 of disc 200 in position I, had depressed the pin in position II, then two racks, 12*o* and 12*n* would be pushed into the closed loop. Similarly by depressing the pin in position III or IV, three or four racks would be pushed into the closed loop following rack 12*e*.

When racks 12 are later reinserted into the storage chamber 16, the rack pins 32 will engage lug 152 of conveyor 146, so that the conveyor will be moved in a clockwise direction and lug 152 will move from the position shown in Figure 11 to the position shown in Figure 1A. At the same time, the disc 200 will be turned in counterclockwise direction, as viewed in Figure 1A, to be returned to its original position.

Air under such temperature and relative humidity suitable for the proofing of the dough is supplied to the proofer from an air conditioner 207 through a duct 208 that extends the length of the proofing chamber 11 and is disposed at the bottom and along one side thereof. A plurality of transversely extending longitudinally spaced discharge ducts 209 communicate with duct 208 and extend across the bottom of the proofing chamber and are now provided with vents for distributing the conditioned air throughout the proofing chamber 11. Air is returned from the proofing chamber 11 to the air conditioner 207 through exhaust duct 210 extending along one side of the top of the proofing chamber, the exhaust duct 210 communicating with a plurality of vented collecting ducts 211 extending crosswise through the top of the proofing chamber 11. An auxiliary supply duct 212 controlled by a damper 213 and communicating with duct 208 is preferably provided and is disposed along one side of the proofing chamber between the racks on upper run 13 and the racks on lower run 14. The auxiliary supply duct 212 communicates with a plurality of vented trim ducts 214 extending transversely through the proofing chamber 11. By proper manipulation of damper 213 controlling the supply of conditioned air through the trim ducts 214, relative conditions in the upper and lower portions of the proofing chamber may be varied as desired.

In the rack lowering station 33, transversely extending pipes 215 are provided at opposite sides of the path of travel of the racks 12 through the rack lowering station, the pipes 215 being connected with a suitable supply of hot water under pressure. A series of apertures 216 in the pipes 215 opening toward the racks being lowered through the rack lowering station, provide a spray for washing the racks at such times that the proofer is not in use for proofing dough. A pit 217 suitably connected with a drain is provided for disposing of the wash water.

Figure 17:
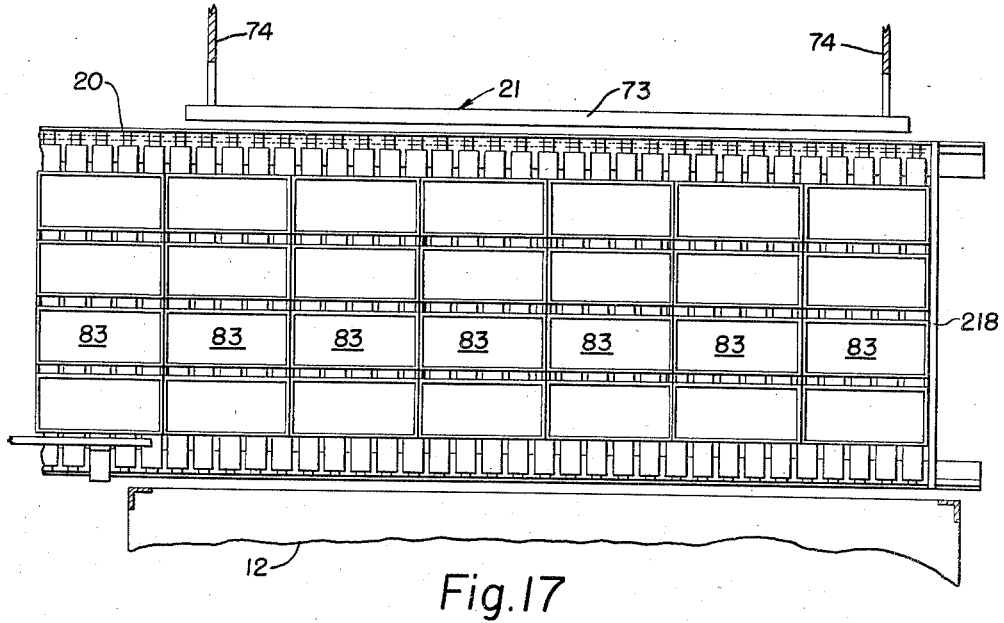
Figure 17 is a plan view of the loading conveyor for bringing pans into the proof box in position to be loaded onto the proof box racks.

In Figure 17, loading conveyor 20 is shown provided with a pan stop member 218, disposed to stop a row of pan sets in proper position to be pushed onto a rack 12 by pusher means 21 without fouling against the sides of the racks 12.

I claim:

1. In an apparatus for proofing dough, a proofing chamber, means for conducting a succession of racks, adapted to support pans of dough to be proofed, in a closed loop through said chamber, means adjacent a section of said closed loop adapted for loading pans of dough to be proofed on said racks and for unloading proofed pans of dough from said racks, and conveying means having one end adjacent said closed loop remote from said loading and unloading means and extending outwardly therefrom and being engageable with a rack for diverting it from said closed loop out of the path of travel of said racks in said closed loop whereby said diverted rack can be by-passed by a succeeding rack.

2. The combination defined in claim 1 including operating means for said conveying means, and control means synchronized with movement of said racks by said conducting means, for energizing said operating means when a particular rack reaches said conveying means.

3. The combination defined in claim 1 including an electric motor for driving said conveying means, a starter for the motor, a circuit including a normally open switch to said starter, and control means operated in synchronism with movement of said racks from said loading and unloading section of said closed loop to said conveying means for closing said switch upon arrival of a selected rack to said conveying means to energize the starter for said conveyor motor.

4. In an apparatus for proofing dough, a proofing chamber, means for conducting a succession of racks, adapted to support pans of dough to be proofed, in a closed loop through said chamber, means adjacent a section of said closed loop adapted for loading pans of dough to be proofed on said racks and for unloading proofed pans of dough from said racks, conveying means having one end adjacent said closed loop remote from said loading and unloading means and extending outwardly therefrom and being engageable with a rack for diverting it from said closed loop and for reinserting said rack into said closed loop, a reversible motor for operating said conveying means, a first starter for said motor for operating said conveying means in a direction to divert a rack from said closed loop and a second starter for said motor for operating said conveying means in a direction to re-insert a rack into said closed loop, a first control means synchronized with movement of said racks by said conducting means for energizing said first starter when a particular rack reaches said conveying means, and a second control means synchronized with movement of said racks by said conducting means for energizing said second starter when a particular rack reaches said conveying means.

5. In an apparatus of the character described, means for conducting a succession of racks in a closed loop including upper horizontal track means and lower horizontal track means for supporting on each a row of contiguous racks movable therealong, an elevating conveyor at one end of said track means for transporting successive racks from said lower to said upper track means to push the row of contiguous racks ahead along said upper track means, a lowering conveyor at the other end of said track means for transporting successive racks from said upper to said lower track means to push the row of contiguous racks ahead along said lower track means, a diverting conveyor subjacent said lowering conveyor operative for selectively removing one or more racks from said closed loop, and a sweep conveyor extending along said lower track means operative to transport racks along said lower track means through the space vacated by the racks removed from said closed loop.

6. The combination defined in claim 5 including operating means for said sweep conveyor, and control means responsive to a rack elevated to a position adjacent the contiguous row of racks on said upper track means for energizing said sweep conveyor operating means and responsive to a rack transported along said lower track means to said elevating conveyor for de-energizing said sweep conveyor operating means.

7. In a conveying apparatus of the character described for progressively moving a plurality or article carrying members in a continuous path, comprising a pair of parallel spaced track means for supporting said article carrying members, transfer means disposed at the respective ends of said track means for transferring said article carrying members from one parallel track to the other, article loading and unloading means associated with one of said transfer means, one of said track means being of a greater length than the other of said track means and arranged to project beyond one of said transfer means, a conveying means associated with said extension of said track and means operatively connected with said conveyor to effect the delivery of at least one of said article carrying members onto said extension of said track, said last mentioned means being capable of pre-selecting and predetermining which article carrying member will be directed onto said extension subsequent to the transfer of said article carrying member from one of said parallel tracks onto the other of said parallel tracks.

8. In a conveying apparatus for progressively moving a plurality of racks in a circuitous path, comprising parallel spaced upper and lower trackways, each having a complement of racks, and wherein said upper trackway has a full complement of racks, elevating and lowering means arranged at the ends of said upper trackway and disposed with respect to said lower trackway for conducting said racks from one of said trackways to the other of said trackways, means for operating each of said elevating and lowering means, said lower trackway extending beyond said lowering means to provide a siding for a plurality of said racks, a selector operatively connected to said elevating means to operate in timed relation with the movement of said elevating means, said selector having a plurality of designating means each corresponding to a rack on said upper trackway and adapted for operation in selecting a rack to be directed to said siding, means actuated by said rack on delivery by said elevating means to said upper trackway for causing said operating means of said lowering means to operate said lowering means to conduct a rack from said upper trackway to said lower trackway, a siding conveyor, and means operated by said selector designating means for driving said siding conveyor to conduct said last mentioned rack onto said siding.

9. A combination defined in claim 8, including a lower track conveyor for advancing said racks on said lower trackway toward said elevating means, means for operating said lower track conveyor and means actuated by a said rack on delivery thereof by said elevating means to said upper trackway for causing said last mentioned operating means to drive said lower track conveyor.

10. The combination defined in claim 9, including means operated by the rack on said lower trackway for stopping said lower track conveyor.

11. The combination defined in claim 8, including a second selector having a plurality of rack designating means, a return siding conveyor and means actuated by said second selector rack designating means for operating said return siding conveyor to conduct a said rack from said siding to said lower trackway.

12. The combination defined in claim 11, including a third selector having a plurality of rack designating means corresponding to the number of said racks on said siding and means operated by said third selector designating means for controlling the number of said racks to return from said siding to said lower trackway.

13. In an apparatus of the character described for moving a succession of racks in a closed loop, spaced upper and lower track means for supporting on each a row of contiguous racks movable therealong, a first endless conveyor at one end of said upper and lower track means including a longitudinal upper reach extending along an end portion of said upper track means, a longitudinal lower reach extending along an end portion of said lower track means and a vertical reach between the ends of said longitudinal reaches, said first endless conveyor having means for engaging and moving the proximate terminal rack on said lower track means along its lower reach, then along its vertical reach and then along its upper reach in position to displace the proximate terminal rack on said upper track means to push the contiguous row of racks on said upper track means ahead, a second endless conveyor at the other end of said upper and lower track means including a longitudinal upper reach extending along an end portion of said upper track means, a longitudinal lower reach extending along an end portion of said lower track means and a vertical reach between the ends of said longitudinal reaches, said second endless conveyor having means for engaging and moving the proximate terminal rack on said upper track means along its upper reach, then along its vertical reach and then along its lower reach in position to displace the proximate terminal rack on said lower track means to push the contiguous row of racks on said lower track ahead, whereby successive racks are moved in position to be engaged by said first and second conveying means, and means for operating said first and second conveyors.

14. The combination defined in claim 1 including operating means for said conveying means, and selector means operating in synchronism with movement of said racks by said conducting means, said selector means being adapted to be pre-set for energizing said operating means when a particular pre-selected rack reaches said conveying means.

15. In an apparatus for proofing dough, a proofing chamber, means for conducting a succession of racks, adapted to support pans of dough to be proofed, in a closed loop through said chamber, means adjacent a section of said closed loop adapted for loading pans of dough to be proofed on said racks and for unloading proofed pans of dough from said racks, conveying means having one end adjacent said closed loop remote from said loading and unloading means and extending outwardly therefrom and being engageable with a rack for diverting it from said closed loop and for reinserting said rack into said closed loop, reversible motive means for operating said conveying means, a first control means synchronized with movement of said racks by said conducting means for effecting operation of said reversing motive means in a direction to divert a rack from said closed loop by said conveying means when a particular rack reaches said conveying means, and a second control means synchronized with movement of said racks by said conducting means for effecting operation of said reversing motive means in a direction to reinsert a rack into said closed loop by said conveying means to follow a particular rack when said particular rack reaches said conveying means.

16. In a conveying apparatus for progressively moving a plurality or racks in a closed loop, comprising spaced upper and lower trackways, each having a complement of racks, and wherein said upper trackway has a full complement of racks, elevating and lowering means arranged at the ends of said upper and lower trackways for conducting successive racks from one of said trackways to the other of said trackways, means for operating each of said elevating and lowering means, a trackway extending outwardly of said closed loop adjacent the lower end of said lowering means to provide a siding for a plurality of said racks, a selector and means for operating the same in timed relation with the movement of said elevating means, said selector having a plurality of designating means each corresponding to a rack on said upper trackway and adapted for operation in selecting a rack to be directed to said siding, a siding conveyor, and means operated by said selector designating means for driving said siding conveyor when said selected rack arrives at said siding to conduct said selected rack onto said siding.

17. In a conveying system, a plurality of racks having a plurality of equidistantly vertically spaced article supporting shelves; means for conducting a succession of racks in a closed loop including an upper and lower horizontal run and a pair of vertical runs connecting the ends of said horizontal runs; means adjacent one of said vertical runs for unloading articles from successive shelves of successive racks and for loading articles on successive shelves of successive racks, said last named means including a pair of vertically spaced supports for articles to be unloaded from said rack shelves and for articles to be loaded onto said rack shelves, and also including pusher means for slidably moving articles onto one of said supports from an alined rack shelf and means for slidably moving articles from the other of said supports onto an alined rack shelf; the shelves of said racks being spaced apart a greater distance than the distance between said pair of vertically spaced article supports, control means for moving said racks along one of said vertical runs in step-by-step movement including means for stopping said racks each time a shelf is alined with an article support and initiating operation of the pusher means associated with the alined article support whereby each shelf is both unloaded and loaded before the succeeding shelf is either unloaded or loaded.

References Cited in the file of this patent

UNITED STATES PATENTS

| | | |
|---|---|---|
| 561,223 | Hamilton | June 2, 1896 |
| 1,458,881 | Gromer | June 12, 1923 |
| 1,772,024 | Baker et al. | Aug. 5, 1930 |
| 1,837,605 | Baker | Dec. 22, 1931 |
| 2,612,238 | Angelicola | Sept. 30, 1952 |